United States Patent
Channamsetti et al.

(10) Patent No.: US 8,904,355 B2
(45) Date of Patent: Dec. 2, 2014

(54) TEST SCRIPT GENERATION SYSTEM

(71) Applicant: Accenture Global Services Limited, Dublin (IE)

(72) Inventors: Srinivasarao Channamsetti, Hyderabad (IN); Ravi Shanker Kommunuri, Hyderabad (IN); Aroop Rohan Mahanti, Hyderabad (IN)

(73) Assignee: Accenture Global Services Limited, Dublin (IE)

( * ) Notice: Subject to any disclaimer, the term of this patent is extended or adjusted under 35 U.S.C. 154(b) by 66 days.

(21) Appl. No.: 13/828,946

(22) Filed: Mar. 14, 2013

(65) Prior Publication Data

US 2014/0282407 A1 Sep. 18, 2014

(51) Int. Cl.
G06F 9/44 (2006.01)
G06F 11/36 (2006.01)

(52) U.S. Cl.
CPC ........ *G06F 11/3684* (2013.01); *G06F 11/3688* (2013.01)
USPC .......................................... 717/124; 717/132

(58) Field of Classification Search
CPC .................................................. G06F 11/3688
USPC .................................................. 717/124, 132
See application file for complete search history.

(56) References Cited

U.S. PATENT DOCUMENTS

| | | | | |
|---|---|---|---|---|
| 6,073,109 A * | 6/2000 | Flores et al. | ............. | 705/7.13 |
| 6,601,019 B1 | 7/2003 | Liles et al. | | |
| 7,421,683 B2 * | 9/2008 | Robertson et al. | ............. | 717/130 |
| 8,056,057 B2 | 11/2011 | Larab et al. | | |
| 8,185,877 B1 * | 5/2012 | Colcord | ............. | 717/127 |
| 8,296,736 B2 | 10/2012 | Jones et al. | | |
| 8,312,322 B2 * | 11/2012 | Gururaj | ............. | 714/25 |
| 8,370,811 B2 * | 2/2013 | Grechanik et al. | ............. | 717/125 |
| 2004/0103396 A1 | 5/2004 | Nehab | | |
| 2005/0229159 A1 | 10/2005 | Haba et al. | | |
| 2010/0325492 A1 | 12/2010 | Isaacs et al. | | |
| 2012/0266136 A1 * | 10/2012 | Brown et al. | ............. | 717/124 |
| 2012/0296687 A1 | 11/2012 | Satyanarayana et al. | | |

FOREIGN PATENT DOCUMENTS

EP 1269321 6/2008
WO 2009/108203 A1 10/2009

OTHER PUBLICATIONS

Hallenberg et al., "Declarative Automated Test", 2012.*
Tsai, W. T., et al., "An Object-Oriented Framework for Testing Software and its Applicaiton to Testing a Real-Time Safety-Critical System", Download Date: Apr. 16, 2013.
"HP Business Process Testing software: test automation focused on your business", White Paper, Apr. 2007.
Miller, Brian C., "Automated Test Generation for Computer Telephony Systems", Teradyne Software and System Test, May 1999.
"Independent Validation and Testing Services", Infosys, download date: Mar. 14, 2013.

(Continued)

*Primary Examiner* — Phillip H Nguyen
(74) *Attorney, Agent, or Firm* — Mannava & Kang, P.C.

(57) ABSTRACT

A test script generation system may generate end-to-end test scripts to test a software application. A workflow generator may generate recommendations of suggested modules corresponding to domain-specific reference application maps to include in a workflow. A visual representation of the workflow may be generated and provide an indication of suggested modules that have not been included in the workflow. A script generator may generate the end-to-end test scripts based on the workflow.

20 Claims, 11 Drawing Sheets

(56) References Cited

OTHER PUBLICATIONS

"Broadening Test Coverage With Test Automation and Automated Test-Case Generation", National Instruments, Oct. 15, 2012.
"Test Automation—Does it make sense?", testing experience: The Magazine for Professional Testers, Dec. 2008.
Legeard, Bruno, Dr., "Model-based Testing: Next Generation Functional Software Testing", Jun. 28, 2010.
Ostrand T et all: "A Visual Test Development Environment for GUI Systems", Software Engineering Notes, ACM, New York, NY, US, vol. 23, No. 2, Mar. 1, 1998, pp. 82-92.
European Patent Application and Search Report on European Patent Application No. 14000924.2, dated Sep. 17, 2014.

* cited by examiner display domains and receive domain selection display maps for domain and receive map selection display suggested modules for map add suggested module to workflow continue to add suggested modules to workflow for end-to-end script

| Manage Prospect - Prospect Creation | | |
|---|---|---|
| Entry Criteria: CSR has access to the Contacts details | | |
| Exit Criteria: A contact record is created | | |
| Go to the <<'Contacts'>> section | | Contacts screen is displayed |
| Select the option to create a <<new Contact>> | | A Page to capture Contact details is displayed |
| Fill in the <<required details>> | Contact Name: <Name><br>Contact Date: <Date><br>Contact Status: <Status><br>Language: <Language><br>Account Type: <Account Type><br>Follow-Up Date: <Date><br>Service or Products of Interest <> | Entered details are displayed |
| Note: See COMMs Testing Data Roadmap for more commonly used parameters | | |
| Save the <<created Contact record>> | | Contact Record save process is initiated and the record is saved and its ID is generated accordingly |
| Check for the Contact Type | | Contact type should be "Prospect" |
| Manage Prospect - Quote Creation | | |
| Entry Criteria: Existing open opportunity | | |
| Exit Criteria: Quote is created for the prerequisite opportunity | | |
| Go to the <<'Quotes'>> section | | Quotes screen is displayed |
| Click on the <<'New'>> button to create a new quote | | A new quote is created |
| Fill in the <<required details>> | Quote Name: <Name> | Entered details are displayed |
| Note: See COMMs Testing Data Roadmap for more commonly used parameters | | |
| Select/Query for the <<account created>> | Opportunity: <Opportunity> | Quote is associated with the account |
| Note: Opportunities need to be created before they can be associated with a quote | | |
| Make a note of the <<Quote ID>> or the Quote Name of the <<created quote>> | | Quote ID or Quote Name is noted |
| Save the <<created quote>> | | Quote is saved successfully |
| Negotiate Sales - Service Configuration - Data | | |
| Entry Criteria: Existing active quote | | |
| Exit Criteria: Customer requested service successfully is configured on the prerequisite quote | | |
| Go to the <<'Quotes'>> section | | Quotes screen is displayed |
| Select/Query for the <<quote created>> in the <<pre-requisite>> | Quote ID: <Quote #> | Quote that is created in pre-requisite gets displayed |
| Go to the <<'Services'>> section to view the list of services available | | The list of services available are displayed |

TEST SCRIPT GENERATION SYSTEM

BACKGROUND

Test scripting is a major, effort-intensive stage in software testing. This stage is predominantly a manual, error-prone process often resulting in high rework and maintenance efforts in addition to scripting. In some instances, the time it takes to create test scripts may equal or exceed the time it takes to test the software being tested. Furthermore, in many situations, the tester does not have expertise in the particular domain in which the software is used, which further exasperates the inefficiencies and error-prone nature of the test scripting stage.

BRIEF DESCRIPTION OF DRAWINGS

The embodiments are described in detail in the following description with reference to examples shown in the following figures.

FIGS. 3-9 illustrate examples of screen shots to generate an end-to-end test script.

FIG. 12 illustrates an example of a sample test script template.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

According to an embodiment, a test script generation system auto-generates workflows and end-to-end test scripts. The system supports software design and testing and effectively automates the test scripting process in software testing. The system may use reference application maps which may describe processes in applications under test and how the processes link to one another. Furthermore, the system can generate suggestions for test script generation for relevant processes and corresponding test scripts that may need to be included in an end-to-end test script to test an application under test (AUT). Thus, software testers that may not have in depth knowledge of the field or domain of the AUT are less prone to missing the testing of important processes performed by the AUT. Also, the system can generate end-to-end workflow diagrams indicating processes tested for the AUT and where each process lies in the overall workflow of the AUT.

Figure 1:
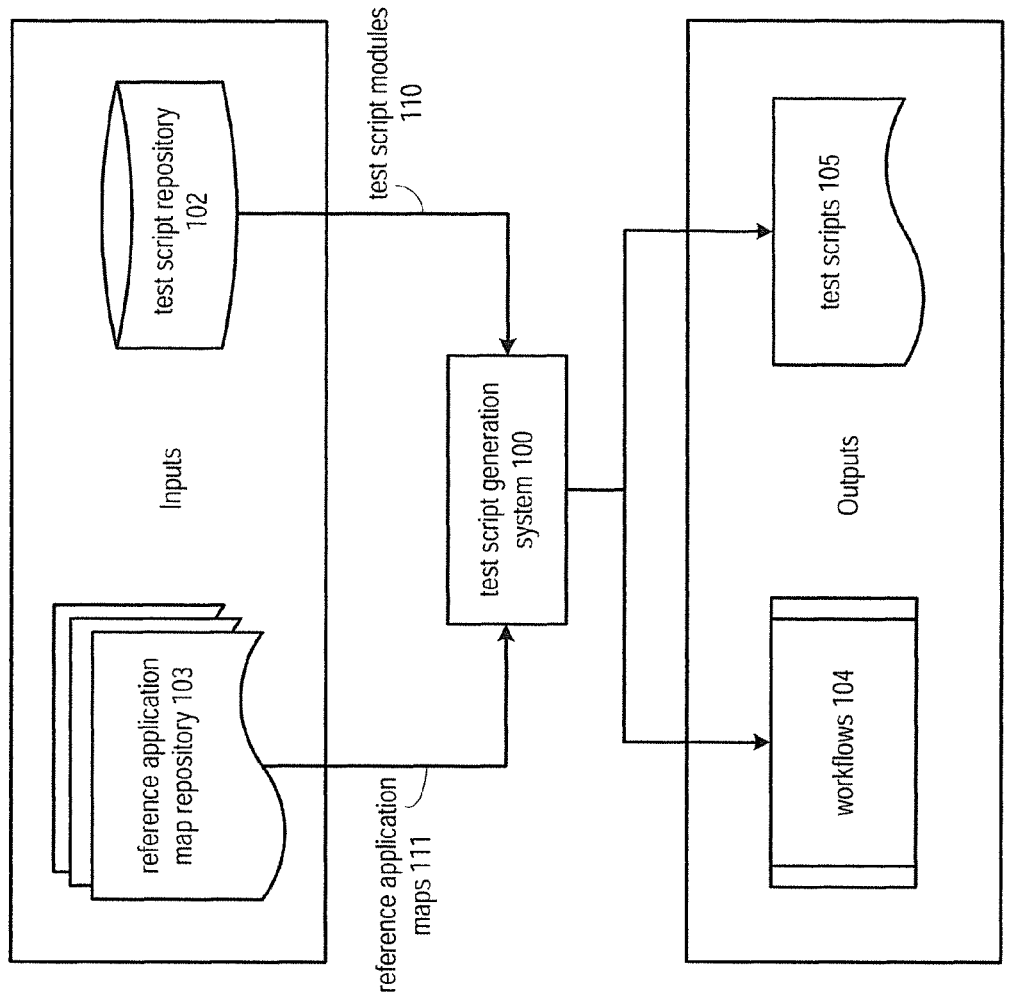
FIG. 1 illustrates an example of a data flow diagram for a test script generation system.

FIG. 1 illustrates a data flow diagram including a test script generation system 100 according to an embodiment. The test script generation system 100 can receive test script modules 110 from a test script repository 102 and receive reference application maps 111 (also referred to as maps 111) from a reference application map repository 103. Test script modules 110 are test scripts that can be combined to form end-to-end test scripts. From the inputs, the test script generation system 100 may generate workflows 104 and test scripts 105 which may be end-to-end test scripts across the AUT.

The test script repository 102 stores test script modules 110 for testing software. The test scripts 110 may be manual test script that include instructions for testing software or may include automated test scripts that are executed to test the software. The manual test scripts are used to explain the manual steps to be performed by a software tester to test the software and may be provided for example in a text document or spreadsheet. The automated test scripts may be used to provide inputs to compatible test automation frameworks built upon existing test automation tools to automatically execute steps to test the software. The test script repository 102 may include a database or another type of data storage system.

The reference application maps 111 document how business processes or any type of processes for an application are mapped together. A map may include modules that describe business processes or other types of processes that are coded to create an application. A module may include a description in XML or another format and the description describes a process coded in an application. A maps may also include a description of how the modules are connected based on a sequence of execution of the modules. For example, if modules represent business processes 1-3 that are to be executed in that order, a map for an application includes the modules for the business processes 1-3 and a description indicating that the modules are mapped together in this order to represent an order of execution of the business processes 1-3.

The workflows 104 generated by the test script generation system 100 may include modules for applications to be tested by a test script. The workflows 104 may be generated based on suggestions provided by the test script generation system 100 according to the maps 111. The test script generation system 100 can generate diagrams of a workflow for example on a graphical user interface that allows users to add or remove modules from a workflow and present suggestions for modules to include in the workflow for example based on a reference application map for the application and modules already included in the workflow. The workflow also includes links to represent how the modules are connected in the workflow and the order of execution of testing each module. Modules may have dependencies, which may include receiving predetermined inputs. These dependencies may be captured by the links and documented in and tested by the test scripts for each module. The test scripts 105 may each include end-to-end scripts that test for example all the modules in a corresponding workflow.

Figure 2:
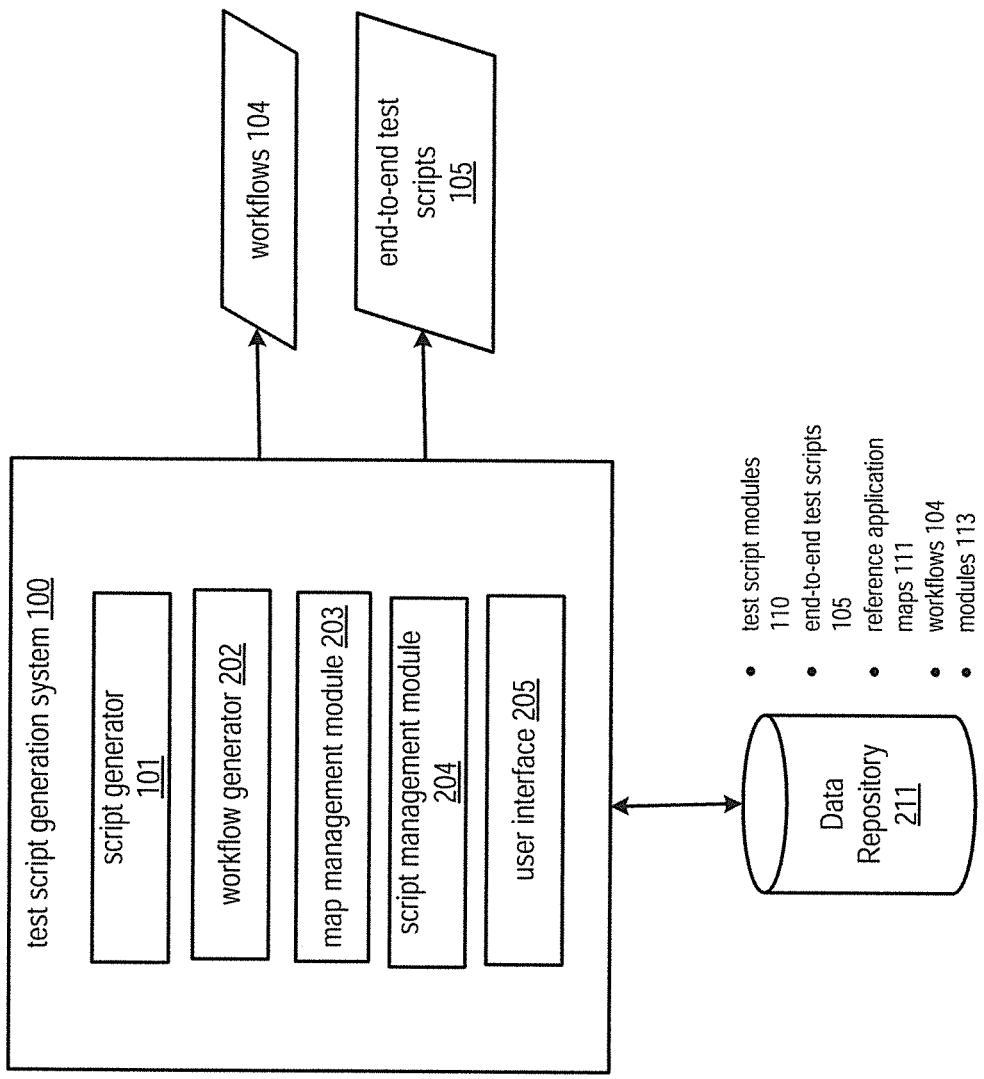
FIG. 2 illustrates the test script generation system according to an example.

FIG. 2 shows a block diagram of the test script generation system 100. The test script generation system 100 may include the script generator 101, workflow generator 202, map management module 203, script management module 204 and user interface 205. The test script generation system 100 may include hardware and/or machine readable instructions executed on the hardware.

The script generator 101 generates the end-to-end test scripts 105 for example based on modules in workflows 104. The workflow generator 202 generates the workflows 104 for example based on user selection of modules to include in the workflows and suggestions determined by the workflow generator 202 from corresponding maps. User interface 205 may include a graphical user interface that can present options for user selections of modules and may receive user selections of modules to generate a workflow.

The map management module 203 can create the reference application maps 111. For example, the map management module 203 allows a user to create maps for different domains and to include modules for applicable processes in the maps. A domain may include a particular field or area in which an application is used. A domain may identify a particular industry or be more specific, such as a particular area within the industry. For example, a domain may be created for the telecommunication industry or domains may be created for broadband, wireless, satellite, etc., for these areas within the industry. The map management module 203 also allows users to add, delete and modify maps as needed.

The script management module 204 can assign a test script to each module and these assignments may be used to create end-to-end test scripts. For example, data repository 211 may store test scripts 110, which may be for the modules 113. The script management module 204 may create and maintain an index that identifies a test script for each module, which may be used by the script generator 101 to identify and combine the test scripts for each module in a workflow to create an end-to-end test script. For example, the index includes an association of module ID and test script for each module. A lookup may be performed on the index with the module ID to retrieve the corresponding test script from the data repository 211. The script management module 204 also may receive test scripts and store the test scripts, such as the test scripts 110, in the data repository 211.

The data repository 211 may include a database or another type of storage system. The data repository 211 may include a single repository comprising the repositories 102 and 103 shown in FIG. 1 or the data repository 211 may comprise multiple repositories such as shown in FIG. 1. The data repository 211 may store any data used by the test script generation system 100, such as end-to-end test scripts 105, test scripts 110 which may be for individual modules, modules 113, workflows 104 and reference application maps 111.

The test script generation system 100 may generate a workflow based on suggested modules. FIGS. 3-9 illustrate examples of screen shots that may be generated by the test script generation system 100 to create a workflow and generate an end-to-end test script from the workflow. The screen shots shown in FIGS. 3-9 and other screen shots described below may be presented in the user interface 205 or may be presented in a user interface of another application. The workflow generator 202 of the system 100 may perform the functions associated with the screen shots to create a workflow, and the script generator 101 may generate the test script.

Figure 3:
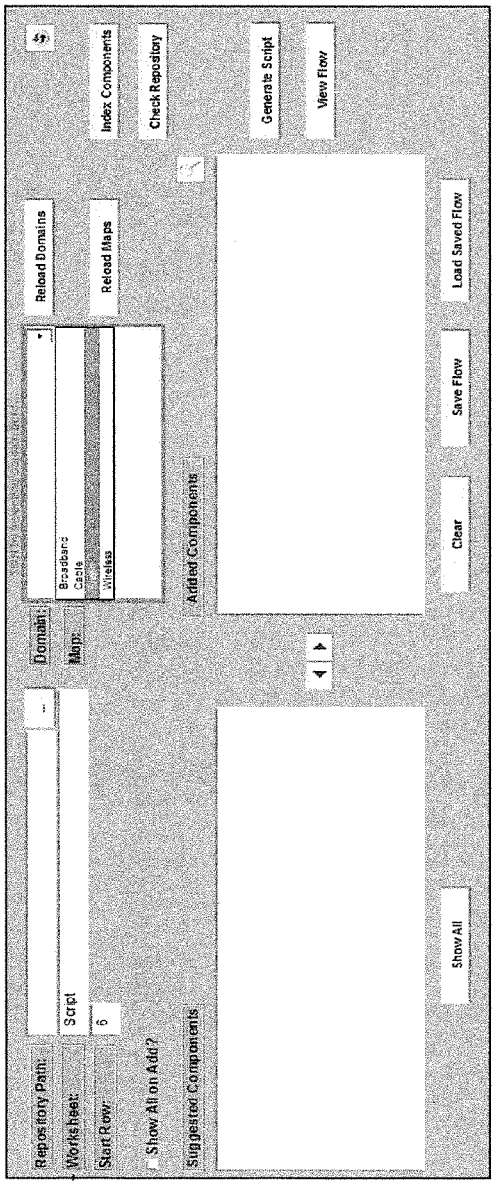

FIG. 3 shows that a domain from a domain drop down menu may be selected. The selection is received and stored. The domains shown in the drop down menu in this example are for different telecommunications domains, such as broadband, cable, fixed and wireless. In this example, the domain is selected for fixed. Fixed may refer to various types of fixed-line products including a fixed telephone line or a landline.

Figure 4:
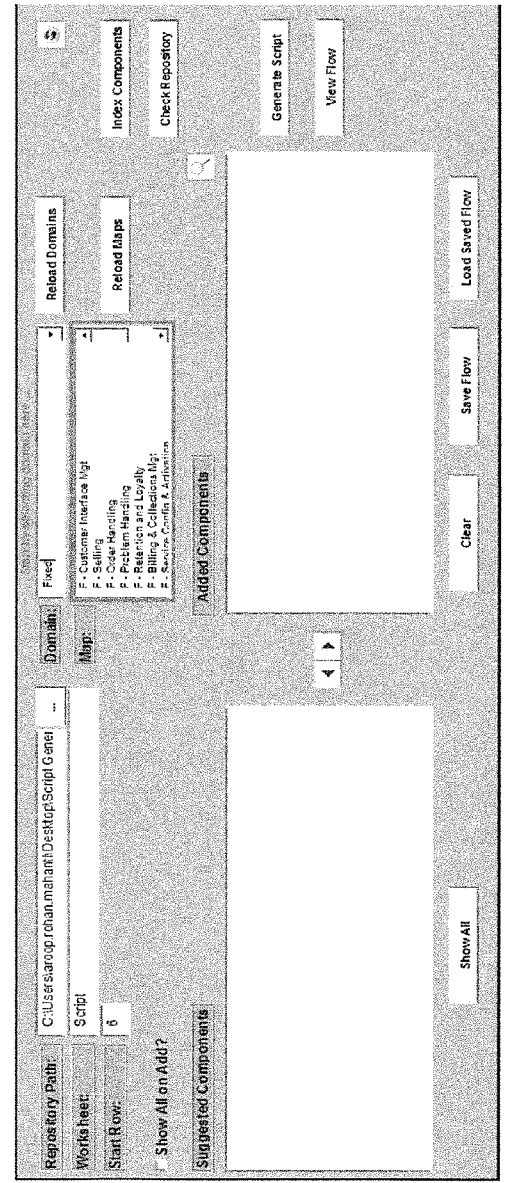

Each domain may have one or more maps associated with it. The domain names and their associated maps may be stored in the data repository 211 and presented for selection. FIG. 4 shows maps associated with the fixed domain which may be presented via a list menu in response to selection of the fixed domain. Each map may be associated with a particular application or a particular process (or set of processes), such as customer interface management, selling, order handling, problem handling, retention and loyalty, billing and collection management, etc., which are all telecom processes followed for fixed-line products. The map examples shown in FIG. 4 are generally related to creating and managing customer contracts for telecommunication services in the fixed domain. A user may select a displayed map and the selection is received and stored.

Figure 5:
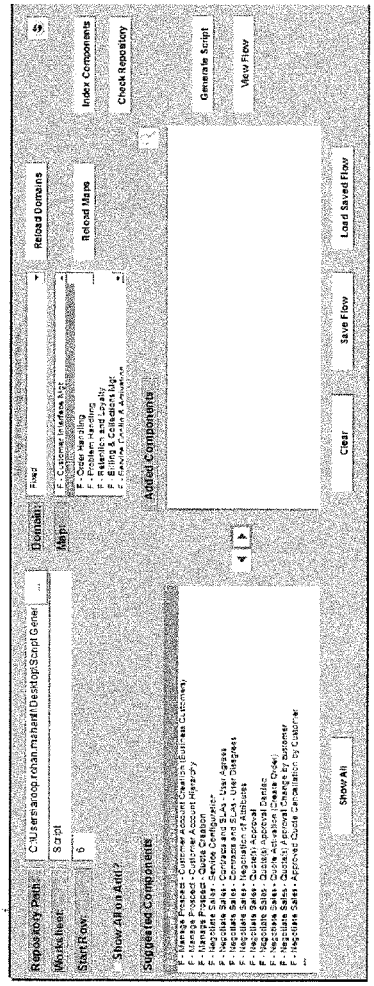
Figure 6:
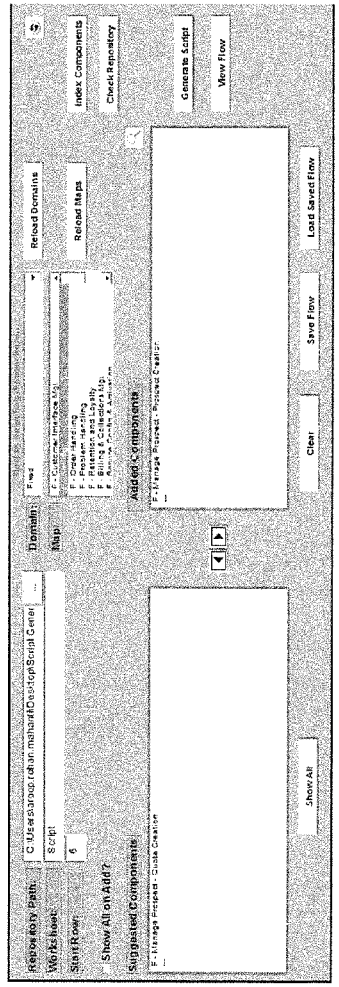
Figure 7:
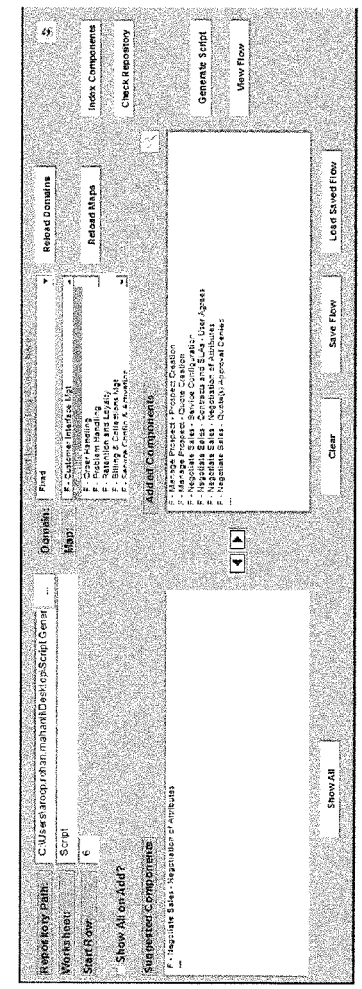

FIG. 5 shows that the modules for the selected map are displayed in the suggested components list box. For example, the selling map is selected and the modules for the selling map are displayed in the suggested components list box. The user can select one of the suggested modules and add it to the added components list box to include the modules in a workflow. FIG. 6 shows that the manage prospect-prospect creation module is added to the workflow by including it in the added components list box. Also, in response to adding the prospect-prospect creation module, the system 100 determines that the next expected module in the map is manage prospect-quote creation, which is displayed by itself in the suggested components list box. The user may then select this module for the workflow. FIG. 7 shows that the process of adding modules is continued until desired by the user. Then, the user may click the save flow button to save the workflow to the data repository 211. This saved flow may then be used as quick reference in the future by re-loading it using the load saved flow button. This may prevent the user from having to re-create the workflow from scratch.

The user may prompt generation of the end-to-end script for the workflow by clicking the generate script button. The system 100 for example copies all the test scripts for the modules in the workflow from the data repository 211 in sequence to a single script to generate the end-to-end script.

FIG. 8 shows the module for manage prospect-create prospect, and shows the manual test script for that module, which in this example includes: goto contact section, select option to create contact, fill it in, save and check the contact type, etc. Examples of manual test scripts are shown for the manage prospect-quote creation and negotiate sales-service configuration-data.

Figure 9:
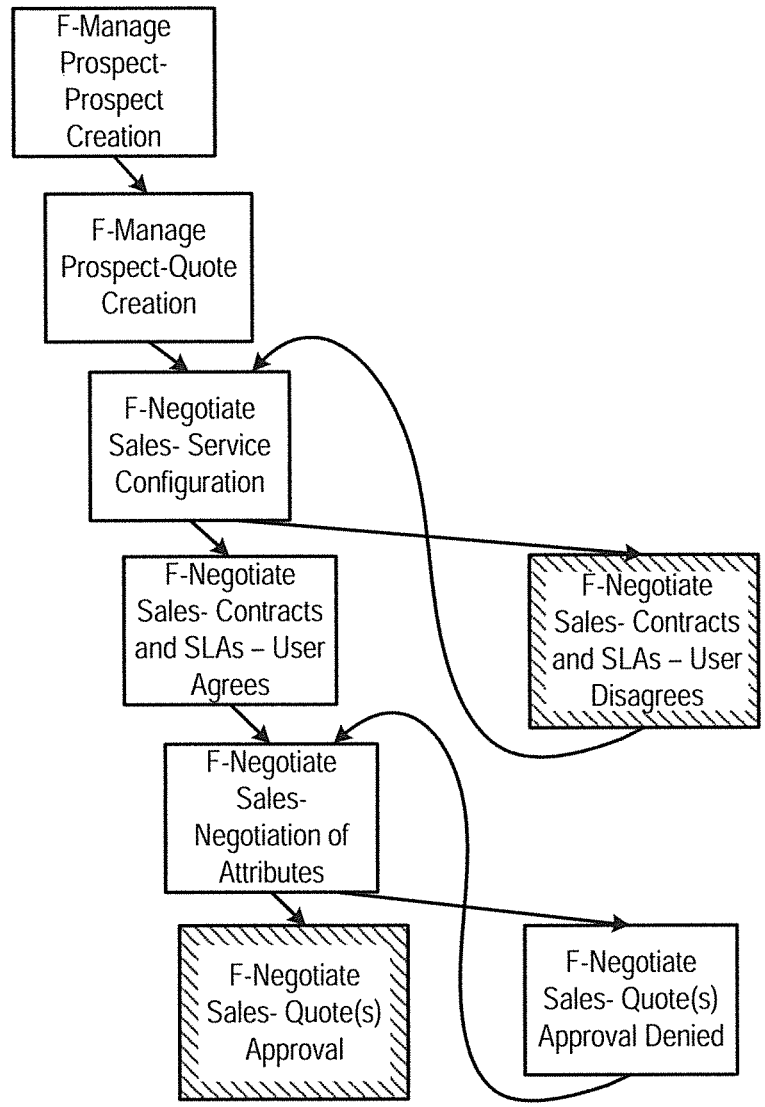

The user may also select the view flow button to view the modules in the workflow in a graphical representation and to show each module's position in the overall process. FIG. 9 shows some of the modules from the workflow in the graphical representation. The system 100 determines from the selected map which of the suggested modules in the process has not been included in the workflow and includes those modules with an indication that they were suggested but not included in the current workflow. In this example, two such modules are shown: negotiate sales-contracts and SLAs-User Disagrees and Negotiate Sales-Quote(s) Approval. For example, the workflow generator 202 determines from associations between the modules in the map that the output of the module negotiates sales-service configuration can be potentially connected to two modules on two different paths. One path, which is currently included in the workflow, represents if the user agrees to the negotiated service configuration, and the second path is if the user does not agree then continue negotiation. The second path is not currently included in the workflow but represents an alternative path which could be tested by the software tester. The second path for example is a branch from the main path. Thus, the module is shown for the second path so the user can select it for the workflow. Similarly, the path including the module for negotiate sales-quote(s) approval is currently not in the workflow but is shown with an indication that the user can recognize as an alternative path that was suggested to be included in the workflow based on the map but is not currently in the workflow.

Figure 10:
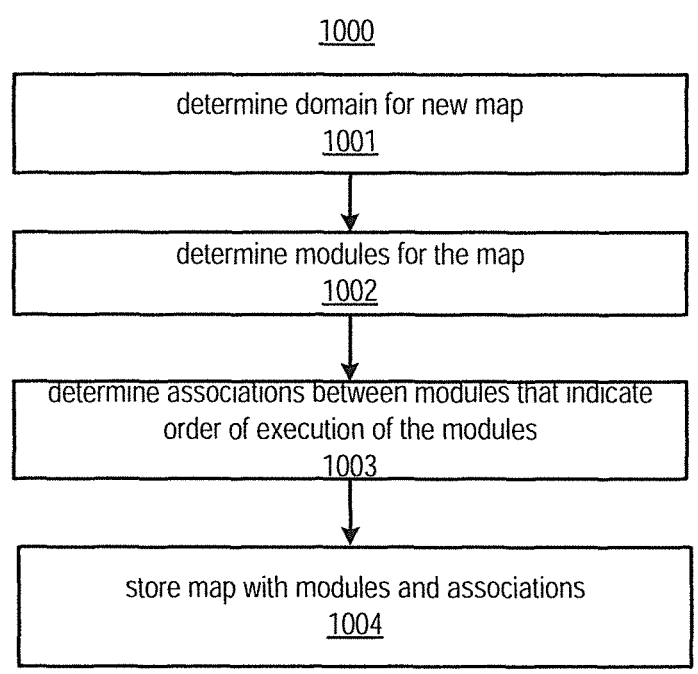
FIG. 10 illustrates an example of a method for building a reference application map.

The system 100 may be used to build the reference application maps 111, which may be used to make suggestions for workflows in various domains as described above. FIG. 10 describes a method 1000 to build a reference application map. The map management module 203 in the system 100 may facilitate building and modifying maps but the method 1000 may be performed by other systems. Also, user inputs for creating a map may be provided via the user interface 205.

At 1001, the map management module 203 determines a domain for a new map to be created. A set of domains may be stored in the data repository. A drop down menu may be provided via the user interface 205 that lists the stored domains, and the map management module 203 receives a user selection of a domain made via the drop down menu. A user may also create a new domain if the map is for a new domain.

At 1002, the map management module 203 determines modules for the map. For example, a user determines all the processes that are performed by an application or by an overall process. The processes may be business processes or any functions or actions that are performed by the application or for the overall process. These processes may be the modules and a user may input the modules into the system 100.

At 1003, the map management module 203 determines the associations between the modules that indicate the order of execution of the modules. The order of executions may include more than one path such as shown in the example in FIG. 9.

At 1004, the map management module 203 stores the map with its modules and associations. For example, table 1 below shows user input comprising a list of all possible modules which may be used in a sample map. Table 1 may be populated by a user via the user interface 205. Assume all the possible modules for the map include components 1-5 shown in column A of Table 1.

TABLE 1

| Column A | Column B | Column C |
|---|---|---|
| Component 1 | | |
| Component 2 | | |
| Component 3 | | |
| Component 4 | | |
| Component 5 | | |

Assume the map is being created for an application that implements business rules that follow the following procedures:

From Component 1 a user can traverse to either Component 2 or Component 3;

From Component 2 a user can traverse to Component 3;

From Component 3 a user can traverse either back to Component 2 or to Component 4;

From Component 4 a user can traverse only to Component 5; and

Component 5 is logically the last expected component in the flow.

The associations between the components are entered into Table 1 as shown below. For example, the user inputs all components traversable from Component 2 in its corresponding row:

TABLE 1

| Column A | Column B | Column C |
|---|---|---|
| Component 1 | Component 2 | Component 3 |
| Component 2 | Component 3 | |
| Component 3 | | |

TABLE 1-continued

| Column A | Column B | Column C |
|---|---|---|
| Component 4 | | |
| Component 5 | | |

The user then proceeds to enter all associations in a similar fashion such as follows:

TABLE 1

| Column A | Column B | Column C |
|---|---|---|
| Component 1 | Component 2 | Component 3 |
| Component 2 | Component 3 | |
| Component 3 | Component 2 | Component 4 |
| Component 4 | Component 5 | |
| Component 5 | | |

When the user enters the module IDs in columns B and C to represent the associations with the module in column A, the IDs are entered exactly as they are shown in column A. Then, the map management module 203 stores the map with its modules and associations as determined by the associations in the rows. A map ID may be entered to store the map under the entered name. Also, the user may modify the modules and/or associations in the map by opening the map and making revisions as needed.

Figure 11:
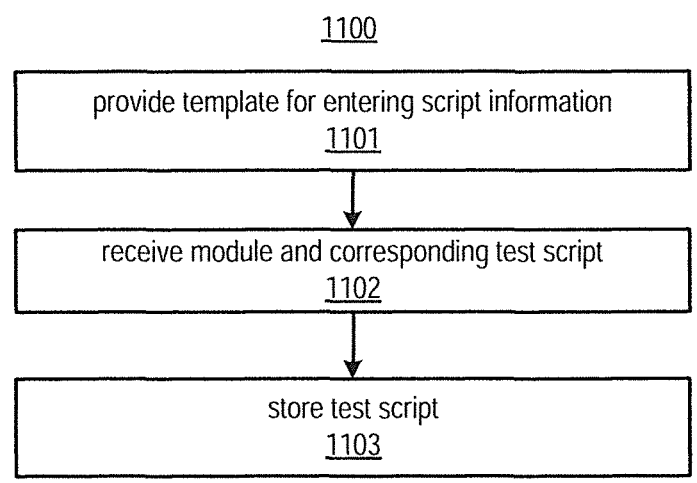
FIG. 11 illustrates an example of a method for creating and storing test scripts.

The system 100 may be used to generate test scripts 110 for modules and end-to-end test scripts 105 for workflows. FIG. 11 describes a method 1100 to create and store test scripts 110 for modules. The script management module 204 in the system 100 may facilitate creating, storing and modifying test scripts but the method 1100 may be performed by other systems. Also, user inputs for creating test scripts may be provided via the user interface 205.

At 1101, a template may be provided for entering test script information. For example, through the user interface 205, the user selects a menu to create test scripts and a template may be displayed.

Figure 12:
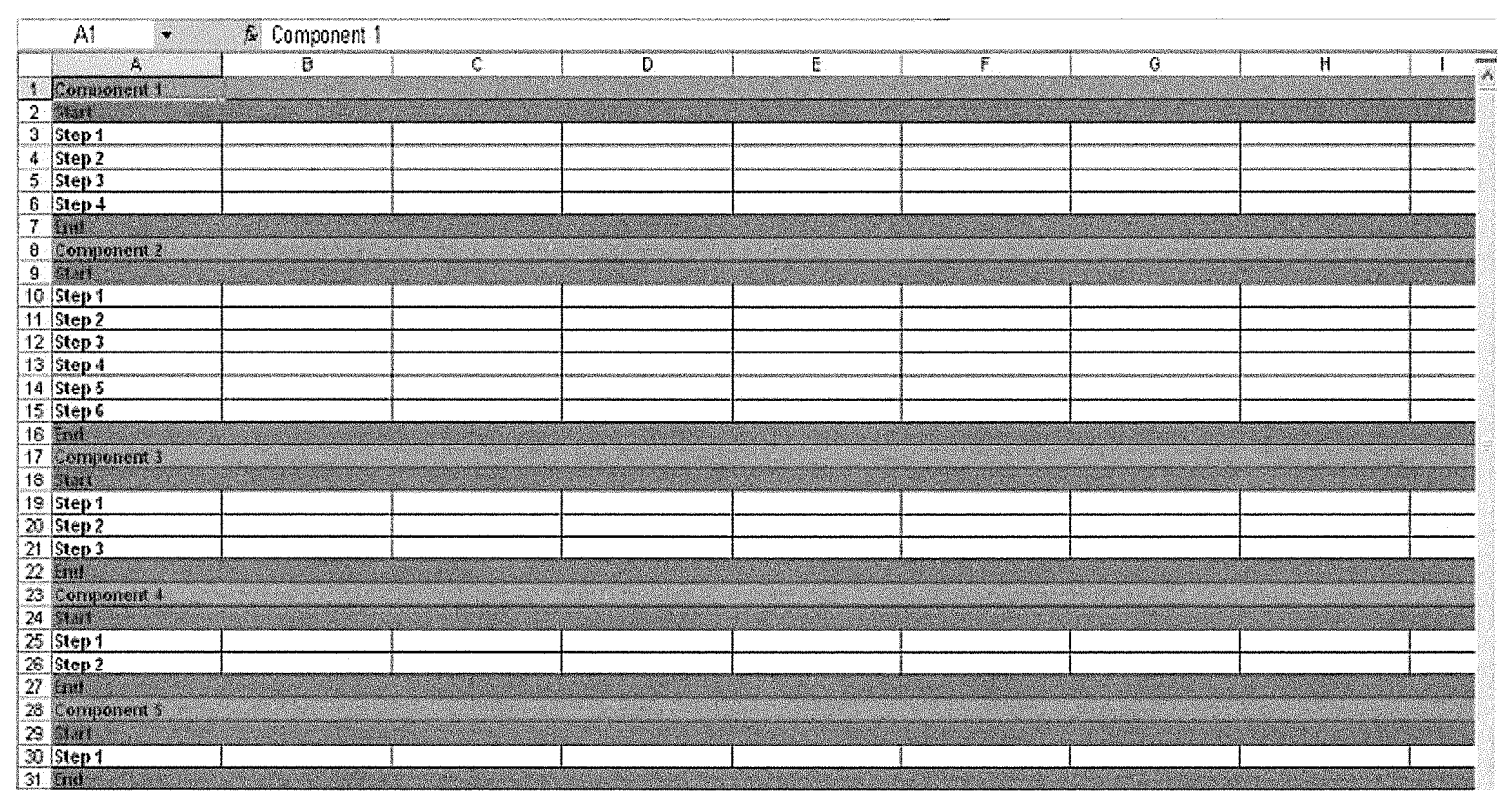

At 1102, the system 100 receives a module and the corresponding test script. FIG. 12 shows an example of a template that allows a user to enter the module ID and steps for manual test scripts. The module ID should match a module ID in a map so the test script can be retrieved for the module to create an end-to-end test script for a workflow. In this example, the template allows a user to create multiple test scripts through the template. A user may also upload an automated test script for a module instead of entering a manual test script.

At 1103, the test script is stored in the data repository 211. Multiple test scripts may be stored at one time through the template. The script management module 204 may create and maintain an index that identifies a test script for each module, which may be used by the script generator 101 to identify and combine the test scripts for each module in a workflow to create an end-to-end test script. The user may revise test scripts as needed, such as through the template.

Figure 13:
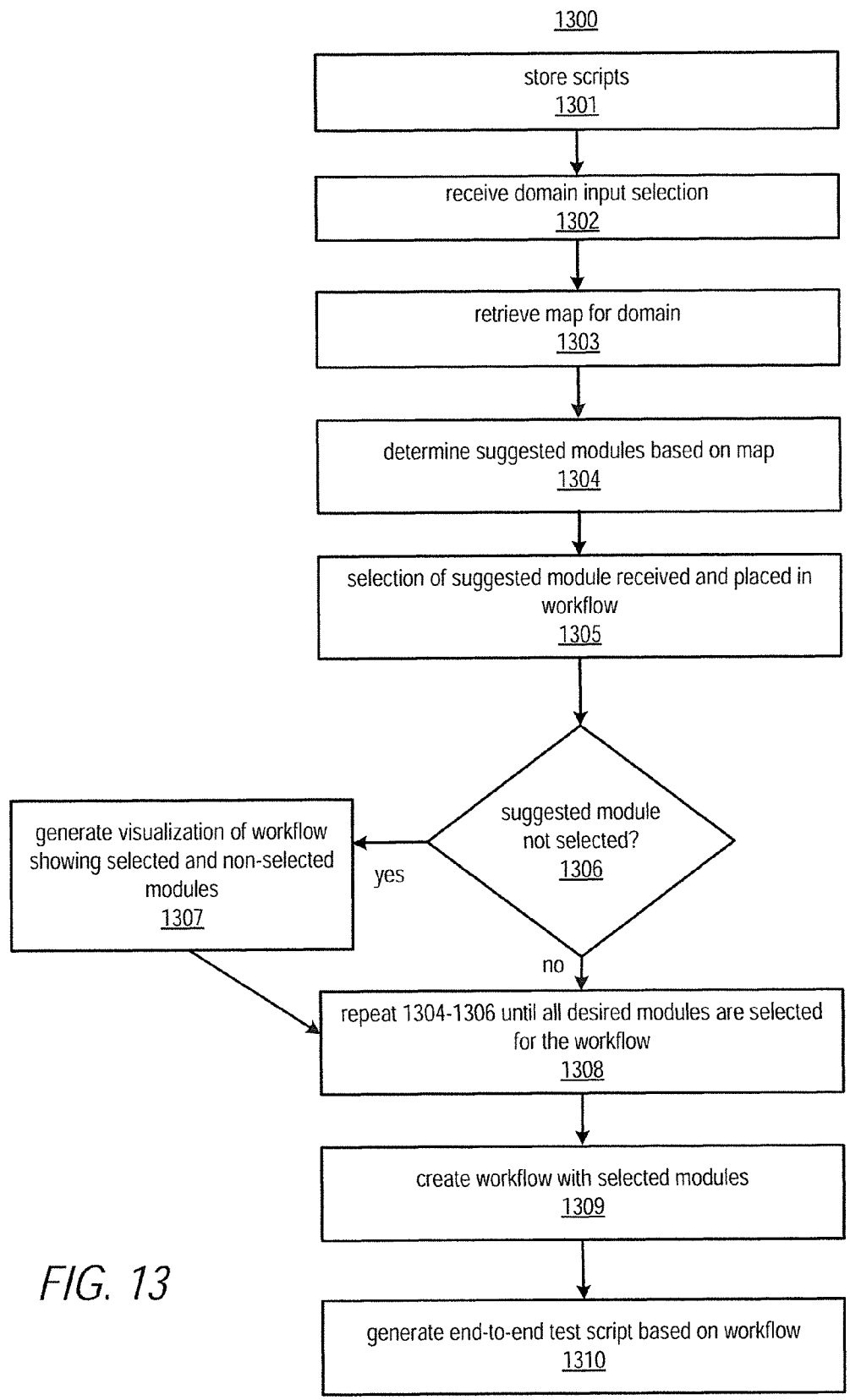
FIG. 13 illustrates an example of a method for generating an end-to-end test script based on a workflow.

FIG. 13 illustrates a method 1300 for generating an end-to-end test script based on a workflow according to an example. The method 1300 may be performed by the script generator 101 by way of example. The method 1300 may be performed in other systems.

At 1301, a plurality of test scripts is stored in the data repository 211. At 1302, a first input is received from a user identifying a domain. At 1303, a map is retrieved for example from the data repository 211 for the domain. At 1304, suggested modules corresponding to the map are determined and presented to the user. At 1305, a selection from the user of a suggested module is received and placed in a workflow.

At 1306, a determination is made as to whether one of the suggested modules is not selected. If the user has not selected one of the suggested modules, the non-selected module is displayed on a visual representation of the workflow, such as shown in FIG. 9, and an indication that the module is a non-selected module that is relevant to the workflow is provided in the display at 1307. At 1308, 1304-1306 are repeated until all the desired modules have been selected for the workflow. At 1309, a workflow is generated with all the selected modules, and at 1310 an end-to-end test script is generated based on the workflow for example by retrieving test scripts for the modules in the workflow and combining the retrieved test scripts.

Figure 14:
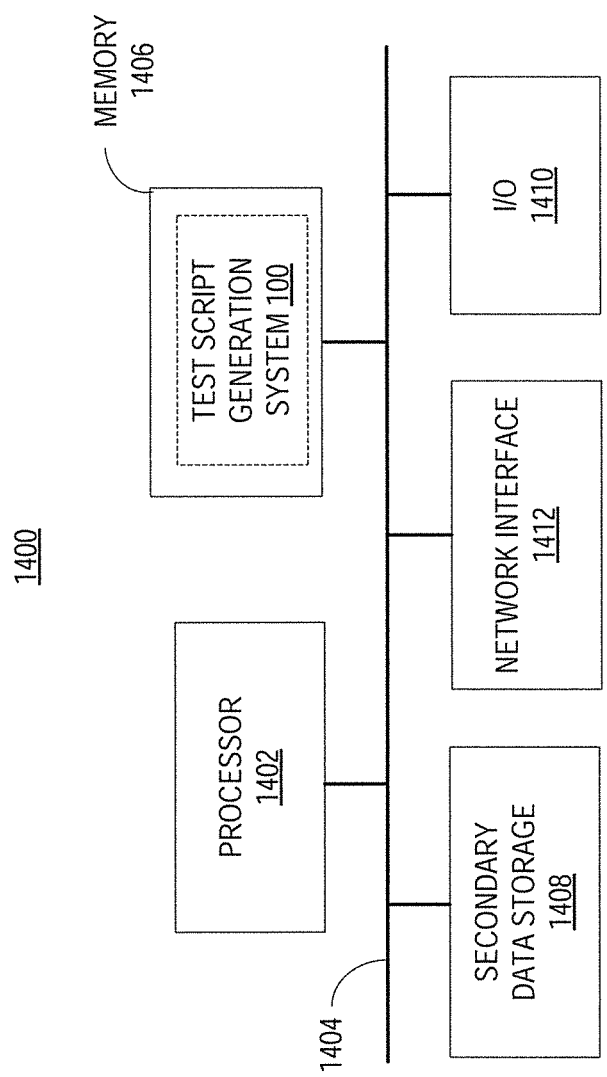
FIG. 14 illustrates an example of a computer system that may be used for the methods and systems described herein.

FIG. 14 shows a computer system 1400 that may be used with the embodiments and examples described herein. The computer system 1400 includes components that may be in a server or another computer system. The computer system 1400 may execute, by one or more processors or other hardware processing circuits, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1400 includes at least one processor 1402 that may implement or execute machine readable instructions performing some or all of the methods, functions and other processes described herein. Commands and data from the processor 1402 are communicated over a communication bus 1404. The computer system 1400 also includes a main memory 1406, such as a random access memory (RAM), where the machine readable instructions and data for the processor 1402 may reside during runtime, and a secondary data storage 1408, which may be non-volatile and stores machine readable instructions and data. For example, machine readable instructions for the test script generation system 100 reside in the memory 1406 during runtime. The memory 1406 and secondary data storage 1408 are examples of computer readable mediums.

The computer system 1400 may include an I/O device 1410, such as a keyboard, a mouse, a display, etc. For example, the I/O device 1410 includes a display to display drill down views and other information described herein. The computer system 1400 may include a network interface 1412 for connecting to a network. Other known electronic components may be added or substituted in the computer system 1400. Also, the script generator 101 may be implemented in a distributed computing environment, such as a cloud system.

While the embodiments have been described with reference to examples, various modifications to the described embodiments may be made without departing from the scope of the claimed embodiments.

What is claimed is:

1. A test script generation system comprising:
a processor;
a data repository to store a plurality of domain-specific reference application maps, wherein each map includes a plurality of modules, and a plurality of test scripts for the modules;
a map management module to receive a first input from a user identifying a domain, and retrieve one of the plurality of domain-specific reference application maps from the data repository for the domain;
a workflow generator executable by the processor to
generate recommendations of suggested modules corresponding to the retrieved map to include in a workflow,
receive a selection from the user of a suggested module to include in the workflow,
determine whether the user has not selected one of the suggested modules,
if the user has not selected one of the suggested modules, display the non-selected module on a visual representation of the workflow and display an indication that the module is a non-selected module that is relevant to the workflow, and
determine a workflow from the selected module and any other modules selected by the user for the workflow; and
a script generator to generate an end-to-end test script based on the workflow.

2. The system of claim 1, wherein the script generator is to identify modules from the workflow, retrieve one of the test scripts from the data repository for each module, and combine the retrieved test scripts to generate the end-to-end test script.

3. The system of claim 2, wherein the workflow generator is to generate an index of modules and a test script for each module, and perform a lookup on the index using a module ID to identify the test script for the module and to retrieve the identified test script from the data repository.

4. The system of claim 1, wherein the workflow generator is to generating the visual representation of the workflow in a user interface, and the visualization includes modules selected for the workflow and the module that is not selected, and the visualization includes a plurality of paths in the workflow and the non-selected module is shown on one of the plurality of paths.

5. The system of claim 1, comprising a script management module to determine a template for generating test scripts, receive user input via the template, wherein the user input includes a module ID and a test script corresponding to the module ID and store the test script and module ID in the data repository.

6. The system of claim 5, wherein the test script comprises a manual test script, and steps for the manual test script are received as user input via the template.

7. The system of claim 5, wherein the test script is an automated test script that is executable by the processor, wherein the automated test script is uploaded to the test script generation system.

8. The system of claim 1, wherein each of the domain-specific reference application maps includes modules and associations between the modules describing an order of execution of the modules.

9. The system of claim 8, wherein the order of execution comprises a plurality of paths including at least one branch from a main path in the order of execution.

10. The system of claim 1, wherein each domain is industry specific and the map for each domain describes a process performed for the industry within the corresponding domain.

11. A method for creating a test script, comprising:
storing a plurality of domain-specific reference application maps in a data repository, each map comprising a plurality of modules;
storing a plurality of test scripts for the modules in the data repository;
receiving a first input from a user identifying a domain;

retrieving one of the plurality of domain-specific reference application maps from the data repository for the domain;

generating recommendations of suggested modules corresponding to the retrieved map from the data repository to include in a workflow;

receiving a selection from the user of a suggested module to include in the workflow;

determining whether the user has not selected one of the suggested modules;

if the user has not selected one of the suggested modules, displaying the non-selected module on a visual representation of the workflow and an indication that the module is a non-selected module that is relevant to the workflow;

determining a workflow from the selected module and any other modules selected by the user for the workflow; and generating an end-to-end test script based on the workflow.

12. The method of claim 11, wherein generating an end-to-end test script based on the workflow comprises:

identifying modules from the workflow;

retrieving one of the test scripts from the data repository for each module; and combining the retrieved test scripts to generate the end-to-end test script.

13. The method of claim 12, comprising:

generating an index of modules and test script for each module; and the retrieving of the test script from the data repository for each module comprises performing a lookup on the index using a module ID to identify the test script for the module and retrieving the identified test script from the data repository.

14. The method of claim 11, wherein the displaying of the non-selected module comprises:

generating the visual representation of the workflow in a user interface, wherein the visualization includes modules selected for the workflow and the module that is not selected and is relevant to the modules in the workflow.

15. The method of claim 14, wherein the visualization includes a plurality of paths in the workflow and the non-selected module is shown on one of the plurality of paths.

16. The method of claim 11, wherein each of the domain-specific reference application maps includes modules and associations between the modules describing an order of execution of the modules.

17. The method of claim 16, wherein the order of execution comprises a plurality of paths including at least one branch from a main path in the order of execution.

18. The method of claim 11, wherein each domain is industry specific and the map for each domain describes a process performed for the industry within the corresponding domain.

19. A non-transitory computer readable medium including machine readable instructions executable by a processor to:

store a plurality of domain-specific reference application maps in a data repository, each map comprising a plurality of modules;

store a plurality of test scripts for the modules in the data repository;

receive a first input from a user identifying a domain;

retrieve one of the plurality of domain-specific reference application maps from the data repository for the domain;

generate recommendations of suggested modules corresponding to the retrieved map from the data repository to include in a workflow;

receive a selection from the user of a suggested module to include in the workflow;

determine whether the user has not selected one of the suggested modules;

if the user has not selected one of the suggested modules, display the non-selected module on a visual representation of the workflow and an indication that the module is a non-selected module that is relevant to the workflow;

determine a workflow from the selected module and any other modules selected by the user for the workflow; and generate an end-to-end test script based on the workflow.

20. The non-transitory computer readable medium of claim 19, wherein the instructions to generate an end-to-end test script based on the workflow include instructions to:

identify modules from the workflow;

retrieve one of the test scripts from the data repository for each module; and combine the retrieved test scripts to generate the end-to-end test script.

* * * * *